March 7, 1950  R. H. BOSHEARS  2,499,718
FISHING LURE
Filed Aug. 11, 1947

Inventor
Raymond H. Boshears

By *Clarence A. O'Brien and Harvey B. Jackson*
Attorneys

Patented Mar. 7, 1950

2,499,718

UNITED STATES PATENT OFFICE 2,499,718

FISHING LURE

Raymond H. Boshears, Little Rock, Ark.

Application August 11, 1947, Serial No. 768,006

1 Claim. (Cl. 43—42.47)

This invention relates to new and useful improvements in fishing lures and the primary object of the present invention is to provide a fishing plug so designed as to affect a wriggling motion as the same is pulled through a body of water.

Another important object of the present invention is to provide a fish lure including a body and spoon shaped member carried by the body that directs the currents of the water against the body as the same is pulled by a line to cause an erratic motion to the body which attracts fish thereto.

A further object of the present invention is to provide an artificial fish lure including a body and a plurality of hooks carried by the body at such a location as to tilt the same when pressure is released from the line that is used to pull the body through water, so that the body may be controlled to wriggle, dart back and forth and tip or rock depending upon the pressure applied on the line by the user.

A still further aim of the present invention is to provide a fishing lure that is simple and practical in construction, efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1:
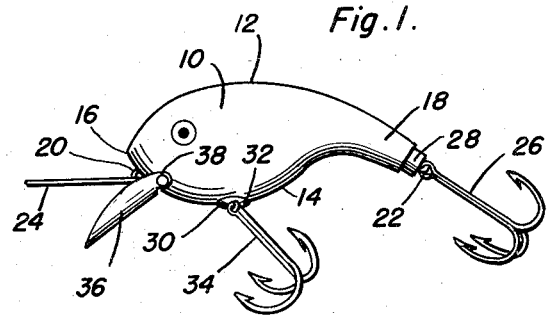
Figure 1 is a side elevational view of the present invention.
Figure 2:
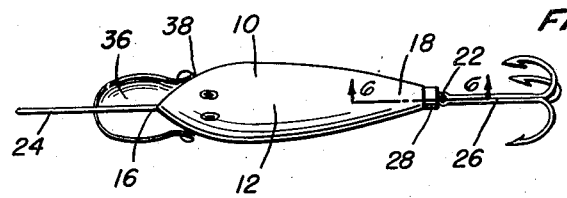
Figure 2 is a top plan view of Figure 1.
Figure 6:
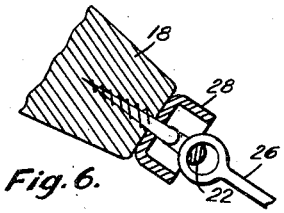
Figure 3:
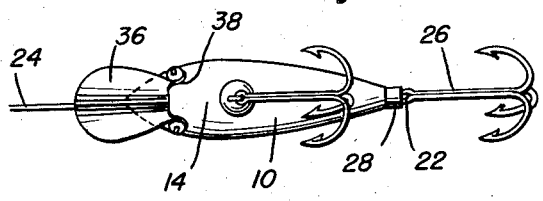
Figure 3 is a bottom plan view of Figure 1.
Figure 5:
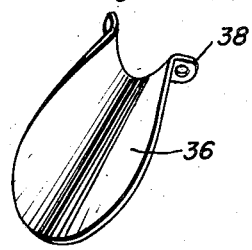
Figure 5 is a perspective view of the spoon element used in conjunction with the present invention; and, Figure 6 is an enlarged longitudinal sectional view taken substantially on the plane of section line 6—6 of Figure 2.
Figure 4:
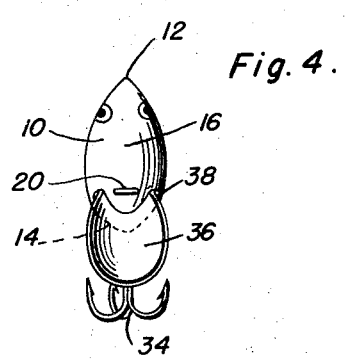
Figure 4 is an end view of Figure 1.

Referring now to the drawing in detail, wherein for the purpose of illustration, there is disclosed a preferred embodiment of the present invention, the numeral 10 represents the body of the present lure, substantially elliptical in cross section having its upper beveled edge 12 and lower beveled edge 14 converging forwardly into a nose 16 and at the rear of the body into an arcuate tail portion 18.

Fixedly engaging the body and the tail portion is a forward eye 20 and a rear eye 22 that respectively engage a fishing line 24 and a rear multiple hook 26.

A retaining sleeve 28 carried by the rod adjacent eye 22 frictionally engages the reduced rear end of the tail portion and prevents twisting or pivotal movement of the tail hook to engage the bottom hooks.

Also carried by the arcuate beveled lower edge 14 of the body 10 at the center thereof, is a plate 30 supporting an eye 32 that engages the eye portion of a forward multiple hook 34.

It should be noted, that the forward eye 20 is disposed slightly below the nose 16 and on edge 14 for a purpose which will later be more fully described.

The numeral 36 represents a spoon shaped member which is longitudinally curved to permit a current of water to enter thereon to engage the body. This member 36 is provided with a pair of tongues 38 that are bent outwardly to receive suitable fasteners for removably securing the member to the body 10 below eye 20 at an inclined angle to the axis of the body, as shown in Fig. 1.

In practical use of the device, when the line 24 is pulled toward the user, a current of water will engage the spoon member and will be diverted to opposite sides of the body causing an erratic back and forth wriggling and darting motion of the body. As pressure is released from the line, the hooks 24 and 36 are so disposed as to cause the body to rock up and down so that the user may pull the line toward him by a jerky motion thereby affecting various motions to the body that greatly attract fish to the same to strike at the hooks.

In view of the foregoing description taken in conjunction with the accompanying drawing it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A fishing lure comprising an elongated body having forward and rear ends, said body being tapered toward its rear end to provide a tail portion, said body having a convex upper longitudinal edge and a lower convex longitudinal edge, a concave recess provided in the lower longitudinal edge and at the rear end of said body, said upper longitudinal edge and said lower longitudinal edge converging and meeting at the forward end of said body, the sides of said body also converging to meet the upper and lower longitudinal edges of said body at the forward end thereof, a concavo-convexed member secured to said body adjacent the forward end thereof and inclining forwardly and downwardly from the forward end of said body, said member having a free end portion projecting beyond the forward extremity of said body, an eye fixed to and projecting rearwardly from the tail portion, a rear gang of hooks pivoted on said eye, a forward gang of hooks pivoted to and depending from the lower convexed edge of said body, and a sleeve engaging the tail portion and limiting pivotal movement of the rear gang of hooks relative to said eye and preventing said rear gang of hooks from engaging the forward gang of hooks.

RAYMOND H. BOSHEARS.

REFERENCES CITED

The following references are of record in the file of this patent:

UNITED STATES PATENTS

| Number | Name | Date |
|---|---|---|
| 966,068 | Williamson | Aug. 2, 1910 |
| 1,582,713 | Welch | Apr. 27, 1926 |
| 1,778,065 | Davenport | Oct. 14, 1930 |
| 1,894,500 | Sweeney | Jan. 17, 1933 |
| 1,977,141 | Pflueger | Oct. 6, 1934 |
| 1,999,522 | Van Houten | Apr. 30, 1935 |
| 2,179,641 | Lay Field | Nov. 14, 1939 |
| 2,220,133 | Sweeney | Nov. 5, 1940 |
| 2,277,453 | Phillips | Mar. 24, 1942 |